US007995070B2

(12) United States Patent
Takahashi (10) Patent No.: US 7,995,070 B2
(45) Date of Patent: Aug. 9, 2011

(54) COLOR PROCESSING APPARATUS AND METHOD THEREOF

(75) Inventor: Kosei Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 12/102,494

(22) Filed: Apr. 14, 2008

(65) Prior Publication Data

US 2008/0266316 A1     Oct. 30, 2008

(30) Foreign Application Priority Data

Apr. 26, 2007    (JP) ................................. 2007-117623

(51) Int. Cl.
| | |
|---|---|
| G09G 5/00 | (2006.01) |
| G09G 5/02 | (2006.01) |
| G06T 1/00 | (2006.01) |
| G06K 0/00 | (2006.01) |
| G06K 9/40 | (2006.01) |
| H04N 1/46 | (2006.01) |
| G03F 3/08 | (2006.01) |
| H04N 1/60 | (2006.01) |

(52) U.S. Cl. ........ 345/581; 345/589; 345/600; 345/549; 345/690; 348/254; 348/602; 348/655; 348/671; 358/525; 358/516; 358/518; 358/523; 382/167; 382/254; 382/274; 382/300; 349/14

(58) Field of Classification Search .................. 345/581, 345/589–591, 593, 600–602, 606, 618–619, 345/156, 549, 690, 214; 348/254, 227, 366, 348/466, 557, 671, 674, 687, 602, 655; 358/516, 518, 519–523, 525, 461; 382/162–167, 254, 274

See application file for complete search history.

(56) References Cited

U.S. PATENT DOCUMENTS

| | | | | |
|---|---|---|---|---|
| 5,276,779 | A * | 1/1994 | Statt | ................................ 358/1.9 |
| 6,373,531 | B1 | 4/2002 | Hidaka et al. | |
| 6,459,436 | B1 | 10/2002 | Kumada et al. | |
| 6,686,953 | B1 * | 2/2004 | Holmes | .......................... 348/179 |
| 6,724,507 | B1 * | 4/2004 | Ikegami et al. | ................ 358/518 |
| RE42,089 | E * | 2/2011 | Holmes | .......................... 348/179 |
| 2003/0043166 | A1 * | 3/2003 | Kumada et al. | ................ 345/589 |

FOREIGN PATENT DOCUMENTS

JP          09-093451      4/1997

* cited by examiner

Primary Examiner — Wesner Sajous
(74) Attorney, Agent, or Firm — Cowan, Liebowitz & Latman, P.C.

(57) ABSTRACT

In order to obtain an excellent color processing result by calculating an optimal white point in partial adaptation, first white point data which indicates white of a device is input, the first white point data is projected onto a predetermined curve, and white point data in the partial adaptation located on the predetermined curve is calculated using the projected first white point data and the second white point data located on the predetermined curve. Color processing of input color data is performed using the white point data in the partial adaptation, which is corrected in accordance with the positional relationship between the first white point data and projected first white point data, and the color reproduction characteristics of the device.

11 Claims, 11 Drawing Sheets

COLOR PROCESSING APPARATUS AND METHOD THEREOF

BACKGROUND OF THE INVENTION

1. Field of the Invention

The present invention relates to color processing considering chromatic adaptation.

2. Description of the Related Art

Color matching for matching color reproduction between an image display device such as a monitor, projector, or the like and an image output device such as an inkjet or electrophotographic printer is available. There is proposed color matching which converts the absolute value (e.g., the tristimulus value XYZ) of the color of a color patch measured by a measurement device into a color value on a relative color space (color appearance space) considering the color appearance to human, and uses the converted color value.

As a color appearance space, a CIELab space, a JCh space used in CIECAM97s and CIECAM02, or the like is available. In order to convert a measurement value (XYZ value) into that on a color appearance space, a white point (to be referred to as a reference white point, hereinafter) is used as a reference for relative conversion. In general, a color (to be referred to as device white, hereinafter) with a highest brightness which the image display device can display is employed as the reference white point. However, when the color selected as the device white is not an achromatic color but a slightly chromatic color, a phenomenon (incomplete adaptation) occurs in which the human eyes do not completely adapt to the device white. In addition, when viewing a monitor or the like, it is necessary to consider a phenomenon (partial adaptation) in which not only the device white (the white point of the monitor) but also the white point of the light (to be referred to as ambient light, hereinafter) around the viewing environment influences the color appearance.

For example, Japanese Patent Laid-Open No. 9-093451 discloses a technique of calculating a white point in partial adaptation from a plurality of white points to use it as a reference white point.

For example, when the color appearance on a monitor is to be calculated, a white point in the partial adaptation is calculated on a line which connects the white point of the monitor and that of the ambient light. However, since an xy plane, uv plane, or u'v' plane of a color space used to calculate the white point in the partial adaptation shows poor linearity with respect to the distributions of various actual light sources and the human visual characteristics, an optimal white point in the partial adaptation cannot be calculated.

Figure 1:
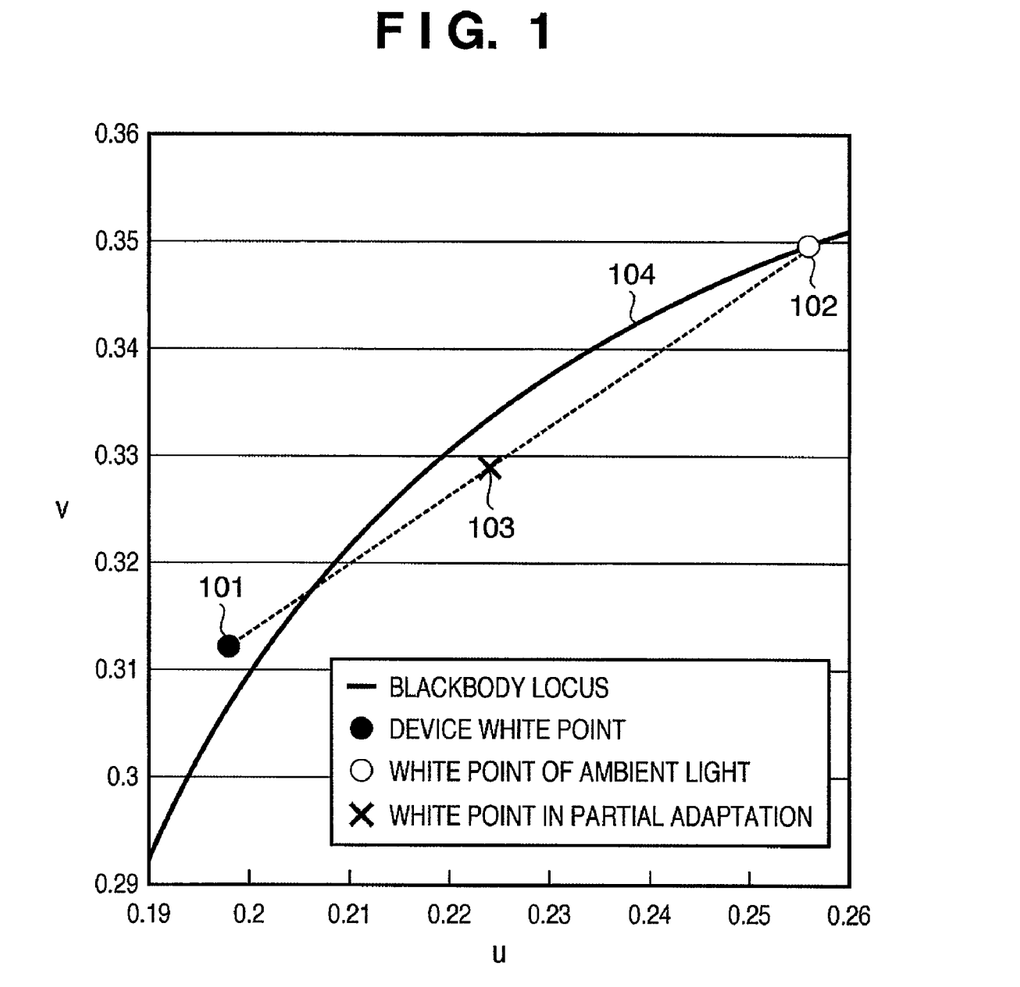
FIG. 1 is a graph showing the method of obtaining a white point in partial adaptation.

FIG. 1 is a graph showing the method of obtaining a white point in the partial adaptation. Assume that a monitor with a white point 101 greenish compared to a blackbody locus 104 is viewed under the ambient light with a white point 102 on the blackbody locus 104. In this case, a white point 103 calculated in the partial adaptation is not a white point on the blackbody locus 104 but a somewhat reddish white point.

In other words, as the technique in Japanese Patent Laid-Open No. 9-093451, a technique of calculating a white point in the partial adaptation on a line which connects two different white points so as to set it as a reference white point does not always calculate an optimal white point in partial adaptation.

SUMMARY OF THE INVENTION

In one aspect, a color processing apparatus comprising: an input section, arranged to input first white point data which indicates white of a device; a projection section, arranged to project the first white point data onto a predetermined curve; a calculator, arranged to calculate white point data in partial adaptation located on the predetermined curve using the projected first white point data and second white point data located on the predetermined curve; a corrector, arranged to correct the calculated white point data in the partial adaptation in accordance with a positional relationship between the first white point data and the projected first white point data; and a color processor, arranged to perform color processing on input color data using color reproduction characteristics of the device and the white point data in the partial adaptation.

According to the aspect, it is possible to calculate an optimal white point in the partial adaptation, thereby obtaining an excellent color processing result.

Further features of the present invention will become apparent from the following description of exemplary embodiments with reference to the attached drawings.

DESCRIPTION OF THE EMBODIMENTS

Color processing of embodiments according to the present invention will be described below in detail with reference to the accompanying drawings.

First Embodiment

The first embodiment exemplifies a case in which color processing is performed to input image data and the processed data is output to an image output device.

[Arrangement of Apparatus]

Figure 2:
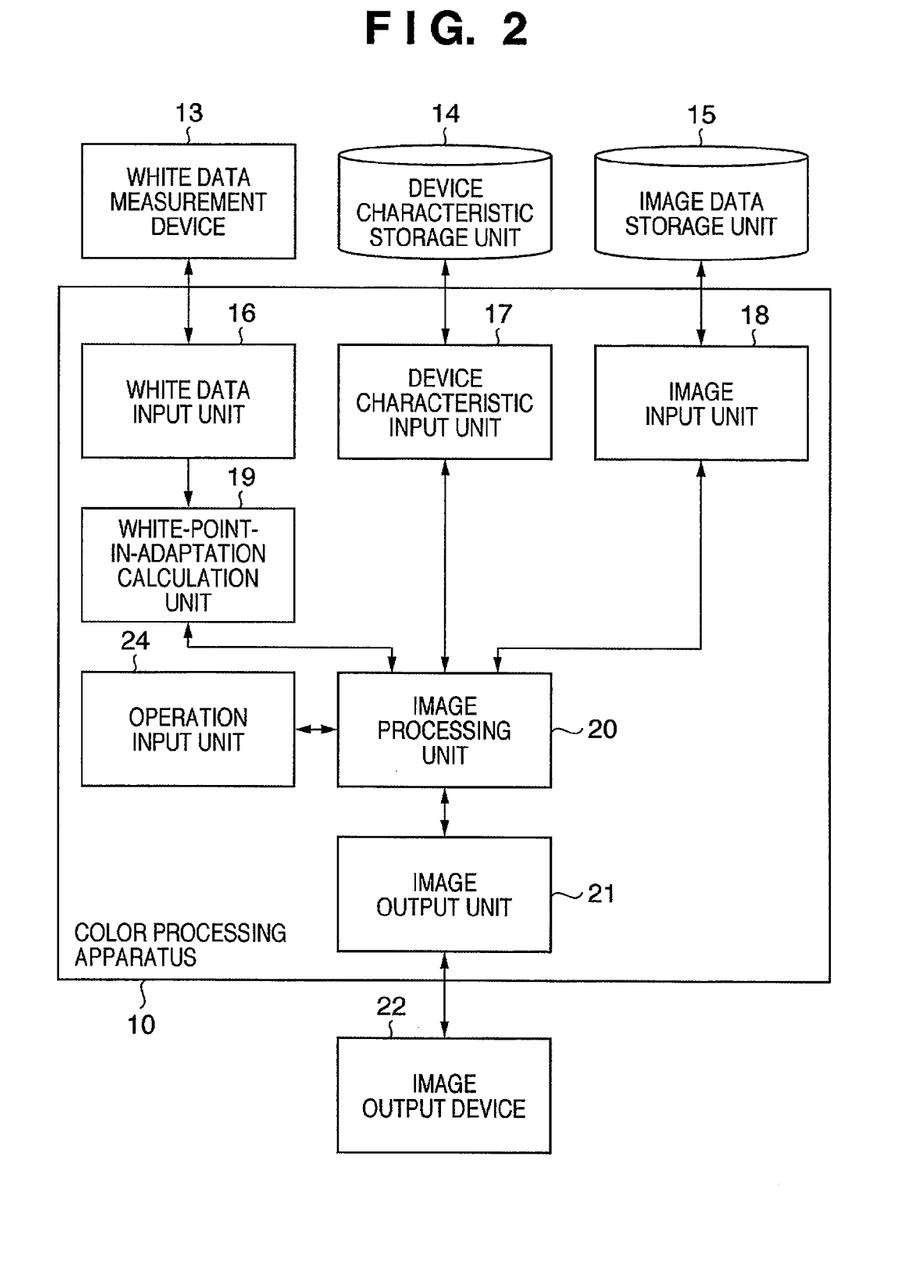
FIG. 2 is a block diagram showing the arrangement of a color processing apparatus of the embodiment.

FIG. 2 is a block diagram showing the arrangement of a color processing apparatus 10 of the embodiment.

An image output device such as a monitor, e.g., a CRT, LCD, or the like, for displaying an image or a printer for printing an image is connected to the color processing apparatus 10 as an image output device 22 for outputting an image which underwent color processing. A white data measurement device 13 such as a chroma-luminance meter or chroma illuminometer for measuring the white point of an image display device or that of ambient light including an illuminant is also connected to the color processing apparatus 10.

A white data input unit 16 is an interface for inputting white point data from the white data measurement device 13 or controlling the white data measurement device 13 so as to input white point data. A device characteristic input unit 17 is an interface for inputting the device characteristics or color reproduction characteristics (device profile) of the image output device 22 from a device characteristic storage unit 14 such as a hard disk drive (HDD) or storage medium drive. An image input unit 18 is an interface for inputting image data from an image data storage unit 15 such as an HDD or storage medium drive.

The device characteristic storage unit 14 or image data storage unit 15 may be a memory card. In this case, the device characteristic input unit 17 or image input unit 18 corresponds to a card reader. The device characteristic storage unit 14 or image data storage unit 15 may be a server device on a network. In this case, the device characteristic input unit 17 or image input unit 18 corresponds to a network interface.

A white-point-in-adaptation calculation unit 19 calculates a white point in partial adaptation by using the white point data input by the white data input unit 16. An image processing unit 20 performs image processing such as color processing to the image data input by the image input unit 18, with reference to the device characteristics or color reproduction characteristics of the image output device 22 and the white point in partial adaptation calculated by the white-point-in-adaptation calculation unit 19. An image output unit 21 outputs the image data which underwent the image processing by the image processing unit 20 to the image output device 22.

An operation input unit 24 includes a pointing device such as a keyboard, mouse, touch panel, or the like, and inputs a user's instruction to the image processing unit 20.

[Image Processing]

Figure 3:
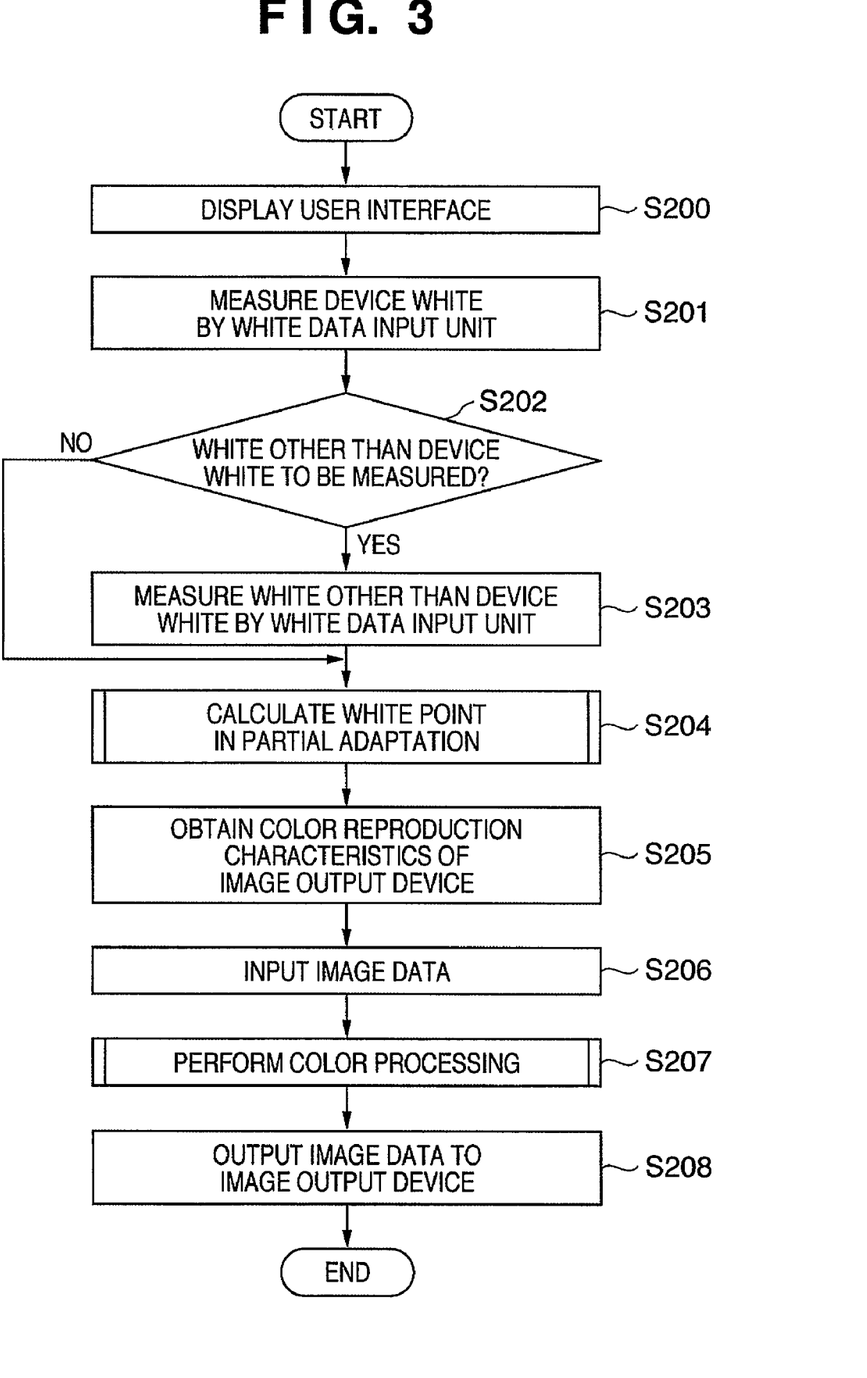
FIG. 3 is a flowchart illustrating the image processing of an image processing unit.

FIG. 3 is a flowchart illustrating the image processing of the image processing unit 20.

The image processing unit 20 displays a user interface (UI) for calculating a white point in adaptation on a monitor (S200). The monitor for displaying the UI can be the image output device 22, or may be separately prepared.

Figure 4:
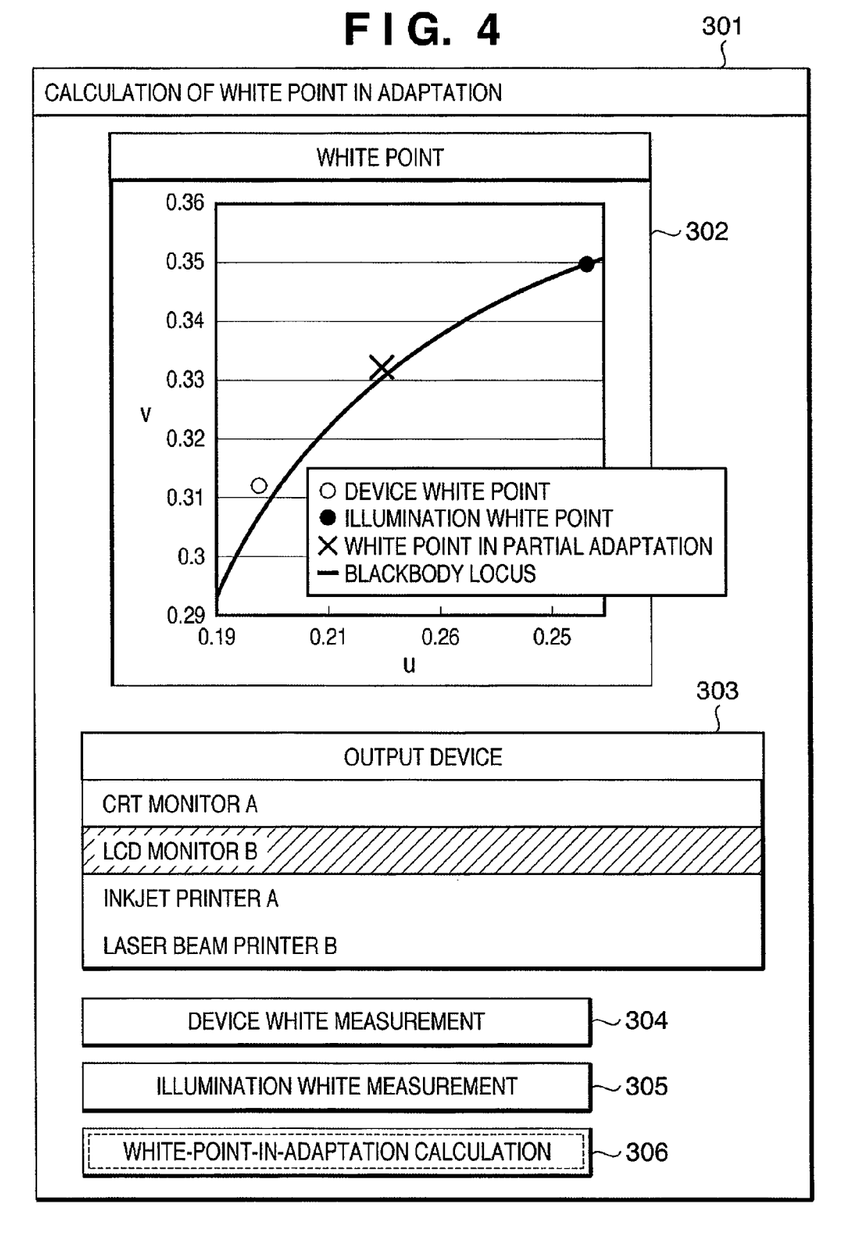
FIG. 4 is a view illustrating an example of a user interface for inputting a user's instruction to calculate a white point in adaptation.

FIG. 4 is a view illustrating an example of a user interface 301 for inputting a user's instruction to calculate a white point in adaptation. The UI will be described in detail later.

When a "device white measurement" button 304 of the UI 301 is pressed, the image processing unit 20 causes the white data input unit 16 to input the measurement result (white point data) of the device white point of the image output device 22 obtained by the white data measurement device 13 (S201).

The image processing unit 20 then determines whether the user designated the white point (to be referred to as the white point other than the device white, hereinafter) of ambient light, for example, the illumination light of a lighting equipment arranged near the monitor, or the like (S202). The user can designate measurement of a white point other than the device white by pressing, for example, an "illumination white measurement" button 305 of the UI 301. When the white point other than the device white is measured, the image processing unit 20 causes the white data input unit 16 to input the measurement result (white point data) of the white point other than the device white obtained by the white data measurement device 13 (S203).

The image processing unit 20 then causes the white-point-in-adaptation calculation unit 19 to calculate a white point in partial adaptation by using the data of the device white point (and that of the white point other than the device white when measurement is done) (S204).

The image processing unit 20 obtains the color reproduction characteristics of the image output device 22 from the device characteristic storage unit 14 through the device characteristic input unit 17 (S205), and inputs image data to be displayed or printed from the image data storage unit 15 through the image input unit 18 (S206).

The image processing unit 20 performs image processing of the input image data, including color processing using the white point in partial adaptation calculated by the white-point-in-adaptation calculation unit 19 and the color reproduction characteristics of the image output device 22 (S207). The image processing unit 20 outputs the image data which underwent the image processing to the image output device 22 through the image output unit 21 (S208).

[User Interface]

The user uses an output device selection section 303 of the UI 301 to select the image output device 22 used to output the image.

When the user uses the output device selection section 303 to select a device, for example, a monitor, which requires measuring the device white point and the white point other than the device white, respectively, he or she presses the "device white measurement" button 304 to designate the measurement of the device white point. The user then presses the "illumination white measurement" button 305 to designate the measurement of the white point other than the device white, and presses a "white-point-in-adaptation calculation" button 306 to designate the calculation of the white point in partial adaptation.

When the user selects a device such as a printer which does not require measuring the device white point and the white point other than the device white, respectively, he or she presses the "device white measurement" button 304 to designate the measurement of the device white point. The user then presses the "white-point-in-adaptation calculation" button 306 to designate the calculation of the white point in partial adaptation.

In a white point display section 302, the device white point as the measurement result (and the white point other than the device white when measurement is done) and the white point in partial adaptation as the calculation result are displayed. With reference to the white point display section 302, the user can determine whether the measurement is appropriate. When the user determines that the measurement is not appropriate, he or she can correct the position or measurement direction of the white data measurement device 13 and press the "device white measurement" button 304 again to designate re-measurement.

[White-Point-in-Adaptation Calculation Unit]

Figure 5:
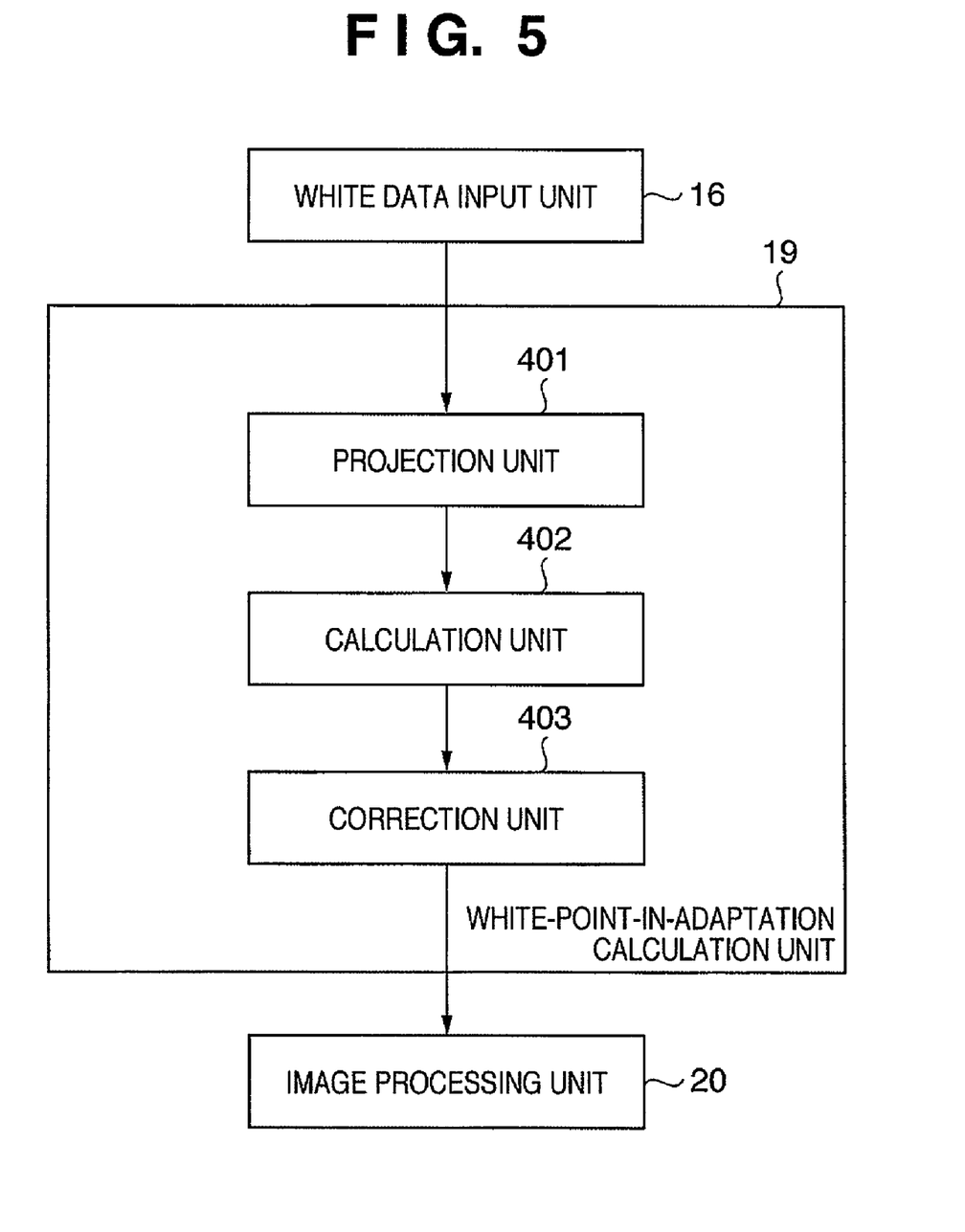
FIG. 5 is a block diagram showing the arrangement of a white-point-in-adaptation calculation unit.
Figure 6:
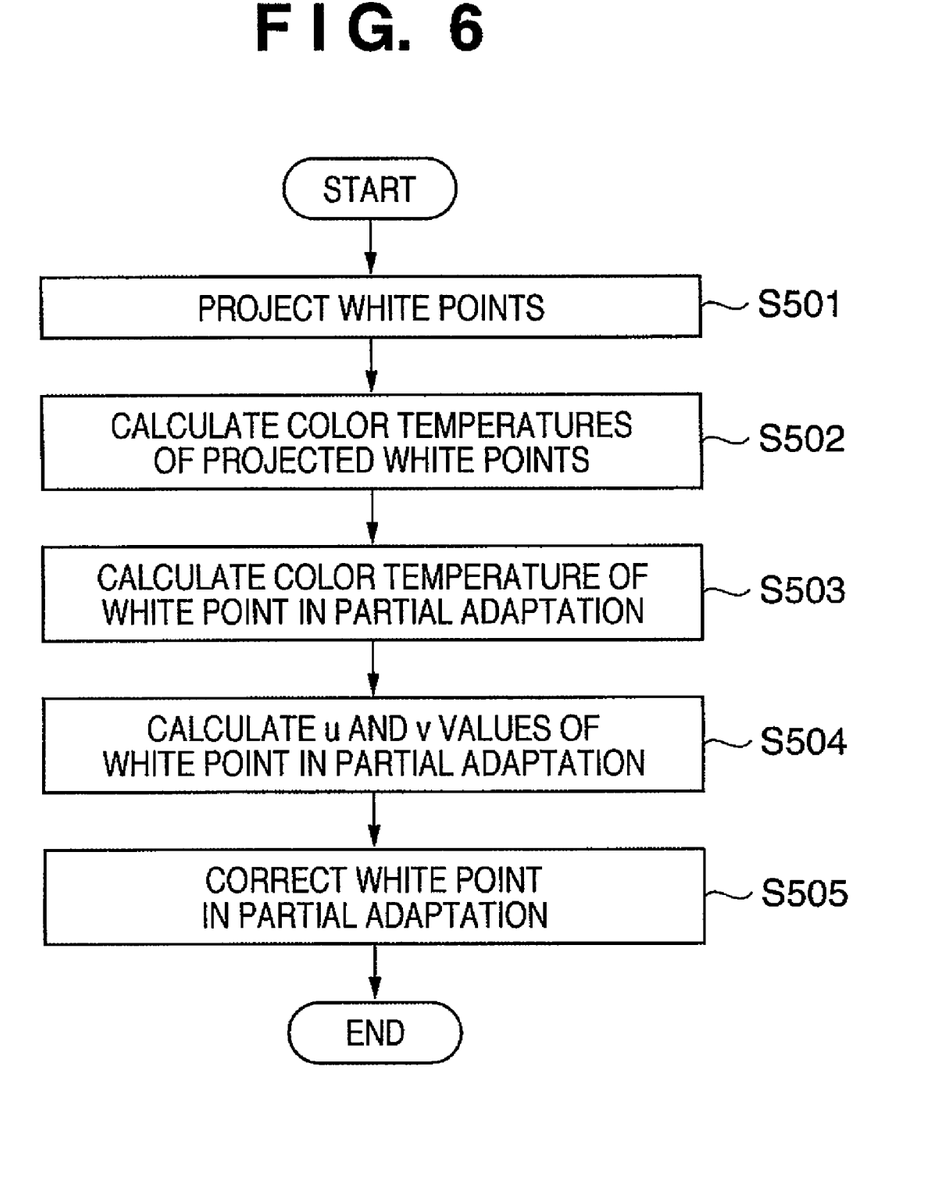
FIG. 6 is a flowchart for explaining the method of calculating a white point in partial adaptation.

FIG. 5 is a block diagram showing the arrangement of the white-point-in-adaptation calculation unit 19, and FIG. 6 is a flowchart for explaining the method of calculating a white point in partial adaptation.

A projection unit 401 of the white-point-in-adaptation calculation unit 19 inputs the data of the device white point (and that of the white point other than the device white when measurement is done) input from the white data input unit 16. The projection unit 401 obtains the intersection points of the perpendiculars from the device white point, white point other than the device white, and a perfect white point, and a blackbody locus. That is, the projection unit 401 projects the respective white points onto the blackbody locus (S501). It is of course unnecessary to project the white point when it is on the blackbody locus.

Figure 7:
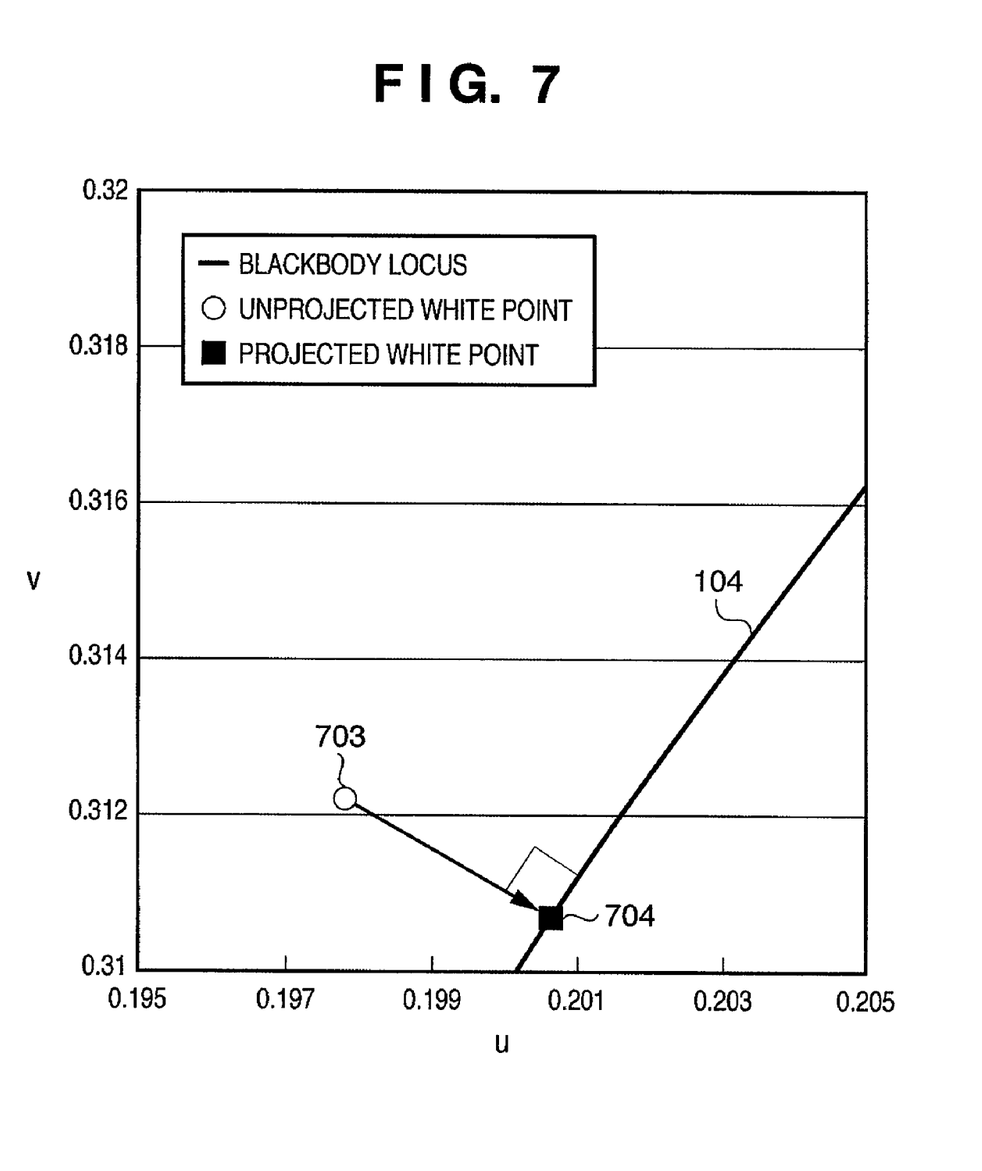
FIG. 7 is a graph for explaining how to obtain the intersection point of each white point and a blackbody locus.

FIG. 7 is a graph for explaining how to obtain the intersection point on the blackbody locus corresponding to each white point. A perpendicular is dropped from a white point (to be referred to as an unprojected white point, hereinafter) 703 to a blackbody locus 104 to obtain an intersection point (to be referred to as a projected white point, hereinafter) 704. The projected white point 704 is determined such that a line, which connects the unprojected white point 703 and projected white point 704, and the tangent of the blackbody locus 104 form a right angle.

A calculation unit 402 calculates color temperatures which correspond to the respective projected white points by looking up a table which describes the relationship between the u and v values of the blackbody locus and the color temperature (S502). The calculation unit 402 calculates a color temperature T of the white point in partial adaptation by using the color temperatures of the respective projected white points by equation (1) below (S503). Note that equation (1) calculates the reciprocal of the color temperature of the white point in partial adaptation by using the linear sum of the reciprocals of the color temperatures of the respective white points.

$$1/T = (D/Td + E/Te + I/Ti)/(D + E + I) \quad (1)$$

for $$D = k_{pd} \cdot L*_d$$

$$E = K_{pe} \cdot L*_e$$

$$I = k_{pi} \cdot L*_i$$

where T represents the color temperature of the white point in partial adaptation;

Td represents the color temperature of the projected device white point;

Te represents the color temperature of the projected white point other than the device white; and Ti represents the color temperature of the projected perfect white point, $$L*_d = 100 \text{ for } Yd \geq Ye$$

$$L*_d = (Yd/Ye)^{1/3} \text{ for } Yd < Ye$$

$$L*_e = 100 \text{ for } Ye \geq Yd$$

$$L*_e = (Ye/Yd)^{1/3} \text{ for } Ye < Yd$$

$$L*_e = 100 \text{ (constant)}$$

$k_{pd}$, $k_{pe}$, and $k_{pi}$ respectively represent a weighting coefficient (constant).

The calculation unit 402 calculates u and v values which correspond to the color temperature T of the white point in partial adaptation as the calculation result, by looking up the table which describes the relationship between the u and v values of the blackbody locus and the color temperature (S504). All the two or three white points for calculating the white point in partial adaptation are on the blackbody locus. Accordingly, the u and v values of the white point in partial adaptation are also on the blackbody locus.

A correction unit 403 corrects the white point in partial adaptation based on the amount of movement of the white point projected by the projection unit 401 (S503), as will be described in detail later.

Perfect White Point

A perfect white point is used to adjust in consideration of incomplete adaptation in which the human eye does not completely adapt to colored device white, that is, does not recognize it as perfect white. Incomplete adaptation can be corrected by setting a white point in partial adaptation between a device white point and a white (perfect white point) which a human senses as absolute white. Therefore, in addition to a device white point and white other than the device white, a third white point as a perfect white point is used to calculate the white point in partial adaptation by equation (1).

The perfect white point can be, for example, equal energy white (a point with tristimulus values X=Y=Z). Alternatively, a white point which the user recognizes as perfect white may be set. In other words, as long as a white point is recognized as perfect white by the user, its color value is not limited.

Correction of White Point in Partial Adaptation

In the white point in partial adaptation calculated in step S502, the color information of the device white point is lost due to the projection of the device white point onto the blackbody locus in step S501. To combat this problem, a white point in partial adaptation in which the lost color information is corrected is calculated.

Figure 8:
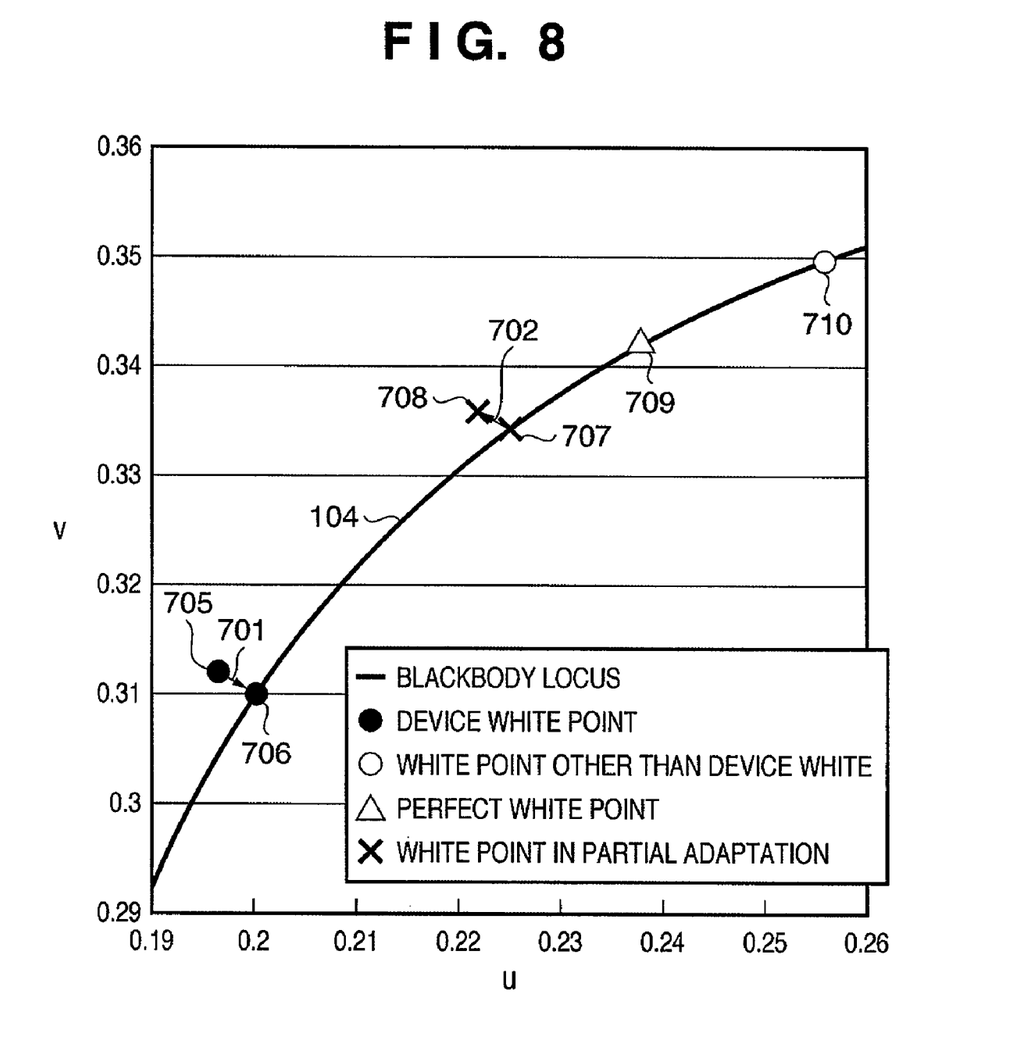
FIG. 8 is a graph for explaining the correction of the white point in partial adaptation.

FIG. 8 is a graph for explaining the correction of the white point in partial adaptation (S505).

A white point in partial adaptation 707 on the blackbody locus 104 is obtained from a projected device white point 706 and a projected perfect white point 709 (and a white point 710 other than the device white when measurement is done) by using equation (1). A motion vector 701 which connects an unprojected device white point 705 and the projected device white point 706 is obtained. The white point in partial adaptation 707 is moved by a motion vector 702 which has the same magnitude as the motion vector 701 but an opposite direction. That is, the vector 702 is added to the white point in partial adaptation 707. With this manipulation, a corrected white point in partial adaptation 708 to which the color information of the device white point 705 is added is obtained.

With this method, it is possible to obtain the color information of a white point in partial adaptation based on the color information of the white point of an output device used to output an image. Accordingly, highly accurate color reproduction can be implemented.

[Color Processing]

Figure 9:
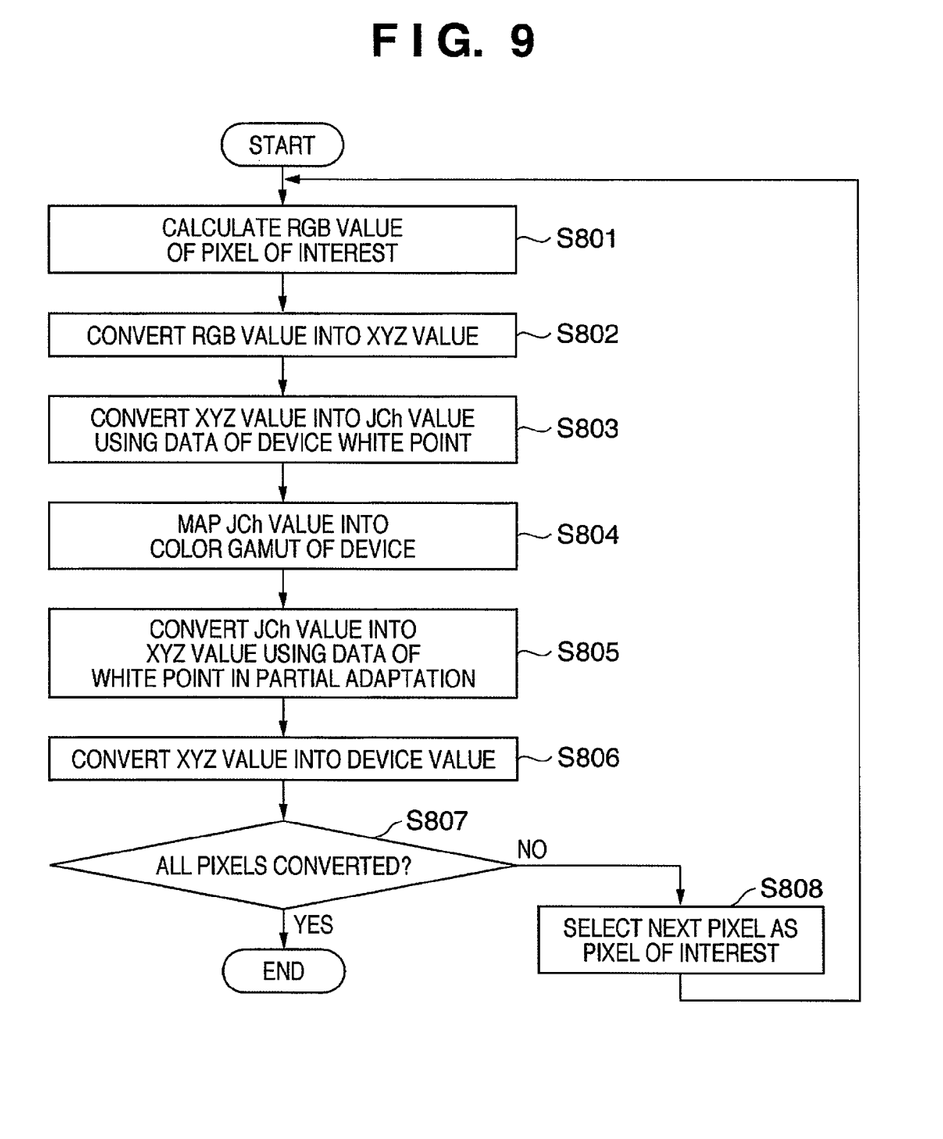
FIG. 9 is a flowchart illustrating color processing as a part of the image processing by the image processing unit.

FIG. 9 is a flowchart illustrating color processing as a part of the image processing (S207) by the image processing unit 20.

The image processing unit 20 calculates the RGB value (e.g., the sRGB value) of a pixel of interest of the input image data (S801).

The image processing unit 20 converts the RGB value into an XYZ value (S802). For example, when the RGB value calculated in step S801 is an sRGB value, the image processing unit 20 executes conversion using an sRGB transformation. The image processing unit 20 then uses white point data to which the RGB value depends to convert the XYZ value into a value (e.g., a JCh value) on a color appearance space considering the human visual characteristics (S803), and maps the JCh value into the color gamut of the image output device 22 (S804).

The image processing unit 20 uses the white point in partial adaptation calculated in step S204 to convert the JCh value into an XYZ value (S805), and uses the device profile of the image output device 22 to convert the XYZ value into a device value (e.g., an RGB value or CMYK value) (S806).

The image processing unit 20 determines whether the values of all the pixels of the input image data have been converted into device values (S807). If NO in step S807, the image processing unit 20 selects the next pixel as a pixel of interest (S808), returns the process to step S801, and repeats the processing in steps S801 to S808 until all the pixels are converted.

In this manner, the white point information of the light source is obtained, the obtained white point and the perfect white point are projected onto the blackbody locus, and the white point in partial adaptation on the blackbody locus is calculated from a plurality of projected white points. The white point in partial adaptation on the blackbody locus is corrected (moved in the opposite direction of the projection) by the projection amount (amount of movement) of the device white point, thereby obtaining a white point in partial adaptation for color processing. Accordingly, when an image is viewed in an image display device such as a monitor, an optimal white point in partial adaptation for obtaining an excellent color processing result considering the monitor white point and ambient light can be calculated.

Second Embodiment

Color processing of the second embodiment will be described below. Note that the same components as in the first embodiment are denoted by the same reference numerals in the second embodiments, and a detailed description will not be repeated.

In the first embodiment, when an image is displayed on an image display device such as a monitor, calculation of a white point in partial adaptation for correcting partial adaptation between the white point of the light source of the monitor and that of the ambient light has been described. In the second embodiment, calculation of a white point in partial adaptation for matching the colors of a display image on a monitor and those of a print image from an image forming device such as a printer will be described. In the case of the second embodiment, not only the white related to the image forming device but also the white of the monitor displaying an input image influences visual adaptation.

Figure 10:
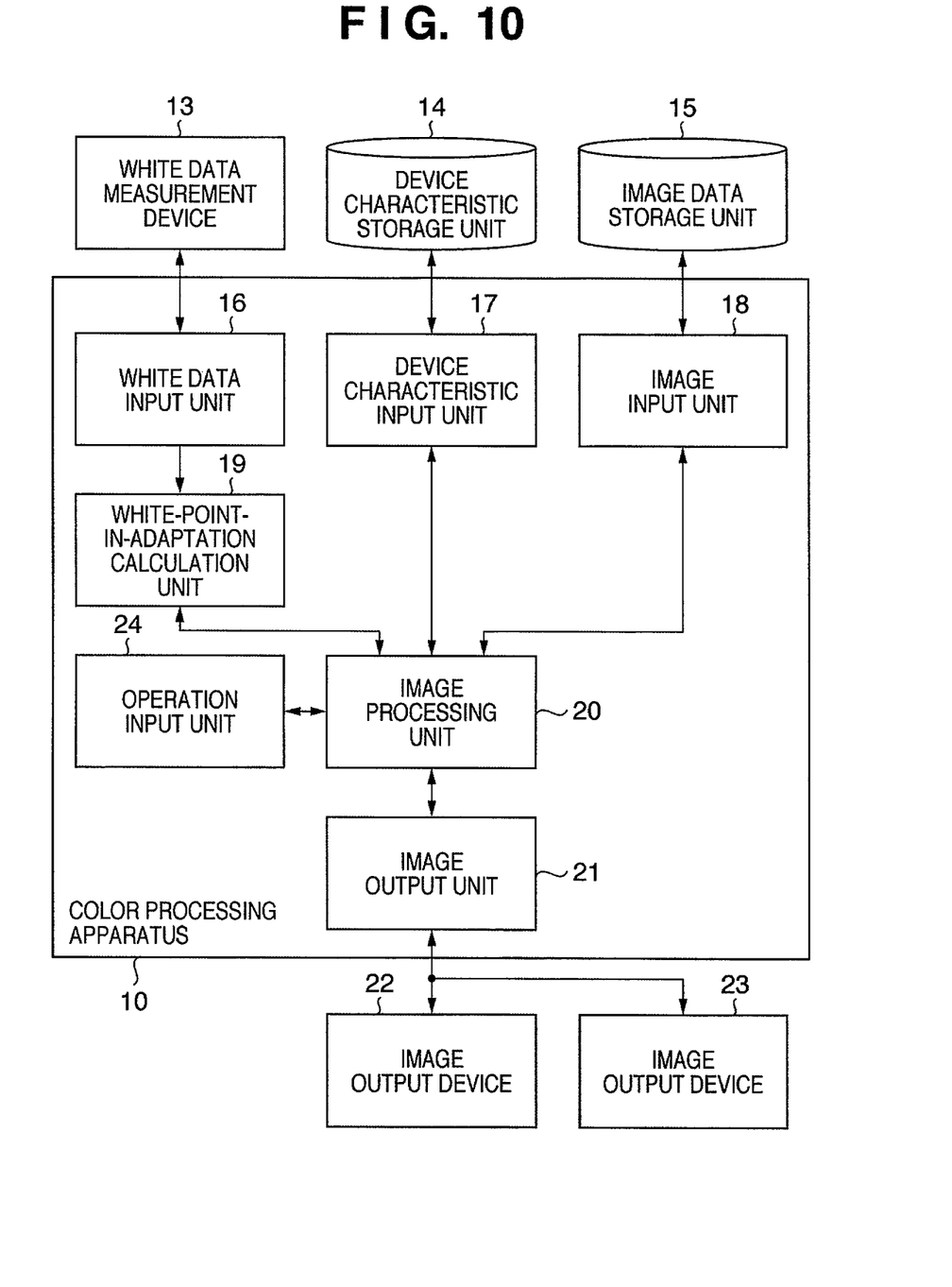
FIG. 10 is a block diagram showing the arrangement of a color processing apparatus of the second embodiment.

FIG. 10 is a block diagram showing the arrangement of a color processing apparatus 10 of the second embodiment. The arrangement of the color processing apparatus 10 is different from that in the first embodiment in that the color processing apparatus 10 comprises, in addition to an image output device 22, an image output device 23 of the different type from the image output device 22. For example, when the image output device 22 is an image display device such as a monitor, the image output device 23 is an image forming device such as a printer.

Figure 11:
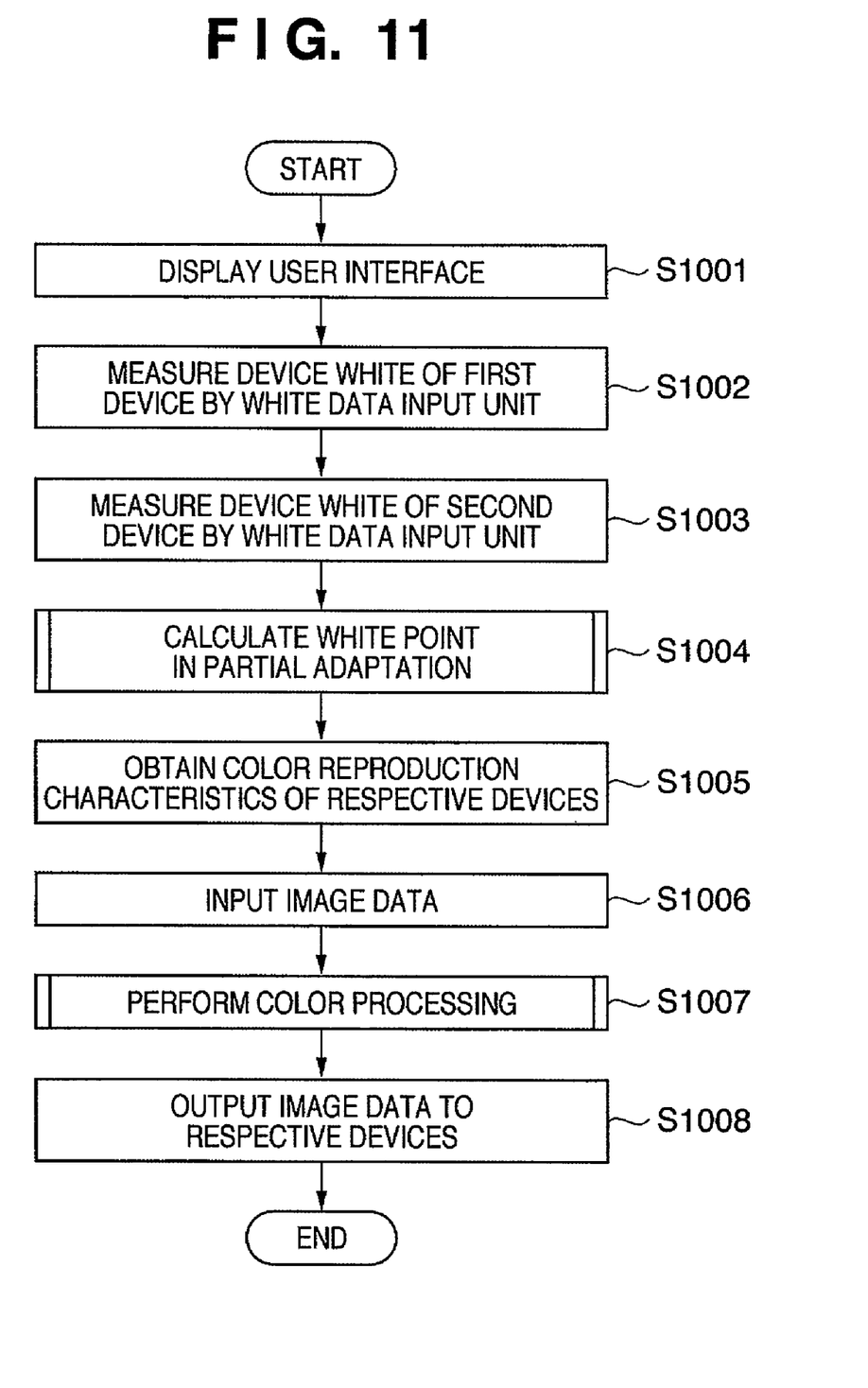
FIG. 11 is a flowchart illustrating the image processing of an image processing unit.

FIG. 11 is a flowchart illustrating the image processing of an image processing unit 20.

The image processing unit 20 displays a UI 301 for calculating a white-point-in-adaptation as shown in FIG. 4 on a monitor and receives the designation of the types of the image output devices 22 and 23 from a user (S1001). In this embodiment, it is assumed that the user designates an image display device such as a monitor as the first device and an image forming device such as a printer as the second device.

When a "device white measurement" button 304 of the UI 301 is pressed, the image processing unit 20 causes a white data input unit 16 to input the measurement result (white point data) of the device white point of the first device obtained by a white data measurement device 13 (S1002). The white data input unit 16 also inputs the measurement result (white point data) of the device white point of the second device (S1003). For the device white point of an image forming device such as a printer, white (paper white) obtained when an unprinted printing medium is placed in the viewing environment is measured.

The image processing unit 20 causes a white-point-in-adaptation calculation unit 19 to calculate a white point in partial adaptation by using the data of the device white points of the two devices, as in the first embodiment (S1004).

The image processing unit 20 obtains the color reproduction characteristics of the respective devices from a device characteristic storage unit 14 through a device characteristic input unit 17 (S1005), and inputs image data to be displayed or printed from an image data storage unit 15 through an image input unit 18 (S1006).

The image processing unit 20 performs image processing of the input image data including color processing using the white point in partial adaptation calculated by the white-point-in-adaptation calculation unit 19 and the color reproduction characteristics of the two devices, thereby generating image data for the first device and that for the second device (S1007). The image processing unit 20 outputs the generated image data to the corresponding device through an image output unit 21 (S1008).

Note that in the image processing in step S1007, almost the same processing as in FIG. 9 is repeated for each device. Of course, in steps S802, S803, S804, and S806, the device profile or measurement result (white point data) of the device white point corresponding to each device is used.

In this manner, when a display image and printed image are placed side by side and viewed, an optimal white point in partial adaptation for obtaining an excellent color processing result considering the white point of a monitor and that of a printed material including the influence of ambient light can be calculated.

Modification of Embodiments

Method of Correcting White Point in Partial Adaptation

In the above described embodiments, the correction method has been described in which the white point in partial adaptation is moved by the magnitude of the motion vector obtained when projecting the device white point onto the blackbody locus. However, when the motion vector is represented by V, k·V (k represents a given coefficient) may be subtracted from the uncorrected white point in partial adaptation. When k=0 is set, no correction is performed. That is, the direction of the motion vector V is rotated (reversed) in the direction of the normal to the blackbody locus, and the obtained vector may be subtracted from the uncorrected white point in partial adaptation.

Blackbody Locus

As long as the color information of a device white point, which is lost upon projecting the device white point onto a predetermined curve including, but is not limited to, a blackbody locus, can be corrected, the correction method and the curve to be used are not particularly limited. As a predetermined curve, for example, a daylight locus can be used.

Color Space

In the above-described embodiments, a CIEXYZ color space is employed as an absolute color space which does not consider reference white, and a CIELab or JCh color space is employed as a color space which considers reference white. However, the present invention is not limited to those. That is, any color space can be used as long as conversion from an absolute color space which does not consider reference white to a relative color space which considers reference white is possible.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-117623, filed Apr. 26, 2007, which is hereby incorporated by reference herein in its entirety.

What is claimed is:

1. A color processing apparatus comprising:
    an input section, arranged to input first white point data which indicates white of a device;
    a projection section, arranged to project the first white point data onto a predetermined curve;
    a calculator, arranged to calculate white point data in partial adaptation located on the predetermined curve using the projected first white point data and second white point data located on the predetermined curve;
    a corrector, arranged to correct the calculated white point data in the partial adaptation in accordance with a positional relationship between the first white point data and the projected first white point data; and
    a color processor, arranged to perform color processing on input color data using color reproduction characteristics of the device and the white point data in the partial adaptation.

2. The apparatus according to claim 1, wherein the predetermined curve is a blackbody locus or a daylight locus.

3. The apparatus according to claim 1, wherein the predetermined curve is a blackbody locus, and said calculator calculates a color temperature of the white point data in the partial adaptation using a color temperature of the projected first white point data and a color temperature of the second white point data.

4. The apparatus according to claim 1, wherein the second white point data is obtained by projecting data of a perfect white point onto the predetermined curve.

5. The apparatus according to claim 4, wherein the perfect white point corresponds to white which a human senses as white.

6. The apparatus according to claim 4, wherein the perfect white point is equal energy white.

7. The apparatus according to claim 1, wherein the second white point data is obtained by projecting white point data of ambient light onto the predetermined curve.

8. The apparatus according to claim 1, wherein said calculator calculates the white point data in the partial adaptation using the projected first white point data, the second white point data, and perfect white point data.

9. The apparatus according to claim 4, wherein the second white point data is obtained by projecting white point data which indicates white of another device onto the predetermined curve.

10. A color processing method comprising:
    using a processor to perform the steps of:
    inputting first white point data which indicates white of a device;
    projecting the first white point data onto a predetermined curve;
    calculating white point data in partial adaptation located on the predetermined curve using the projected first white point data and second white point data located on the predetermined curve;
    correcting the calculated white point data in the partial adaptation in accordance with a positional relationship between the first white point data and the projected first white point data; and
    performing color processing on input color data using color reproduction characteristics of the device and the white point data in the partial adaptation.

11. A non-transitory computer-readable medium storing a computer-executable program causing a computer to perform a color processing method, the method comprising the steps of:
    inputting first white point data which indicates white of a device;
    projecting the first white point data onto a predetermined curve;
    calculating white point data in partial adaptation located on the predetermined curve using the projected first white point data and second white point data located on the predetermined curve;
    correcting the calculated white point data in the partial adaptation in accordance with a positional relationship between the first white point data and the projected first white point data; and
    performing color processing on input color data using color reproduction characteristics of the device and the white point data in the partial adaptation.

* * * * *